United States Patent
Mizuki et al.

(10) Patent No.: US 9,375,645 B2
(45) Date of Patent: Jun. 28, 2016

(54) INFORMATION-PROCESSING SYSTEM, INFORMATION-PROCESSING DEVICE, STORAGE MEDIUM, AND INFORMATION-PROCESSING METHOD FOR SHARING POSTING INFORMATION

(71) Applicant: NINTENDO CO., LTD., Kyoto (JP)

(72) Inventors: Kiyoshi Mizuki, Kyoto (JP); Hideto Yuzawa, Kyoto (JP); Shunsaku Kato, Kyoto (JP); Ryota Oiwa, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 186 days.

(21) Appl. No.: 14/189,290

(22) Filed: Feb. 25, 2014

(65) Prior Publication Data

US 2014/0379802 A1    Dec. 25, 2014

(30) Foreign Application Priority Data

Jun. 24, 2013   (JP) .................................. 2013-131912

(51) Int. Cl.
| | |
|---|---|
| *G06F 15/16* | (2006.01) |
| *A63F 13/87* | (2014.01) |
| *A63F 13/48* | (2014.01) |
| *A63F 13/33* | (2014.01) |

(52) U.S. Cl.
CPC ................. *A63F 13/87* (2014.09); *A63F 13/33* (2014.09); *A63F 13/48* (2014.09)

(58) Field of Classification Search
CPC ... A63F 13/12; A63F 2300/577; A63F 13/87; A63F 13/48; A63F 13/33; H04L 67/10
See application file for complete search history.

(56) References Cited

U.S. PATENT DOCUMENTS

| | | | | |
|---|---|---|---|---|
| 2006/0080702 A1* | 4/2006 | Diez | ....................... | A63F 13/12 725/30 |
| 2009/0233672 A1* | 9/2009 | Yoshizawa | .............. | A63F 13/48 463/13 |
| 2009/0253490 A1* | 10/2009 | Teranishi | ................. | G07F 17/34 463/20 |
| 2009/0307003 A1 | 12/2009 | Benyamin | | |
| 2010/0241971 A1 | 9/2010 | Zuber | | |
| 2013/0237300 A1 | 9/2013 | Johnson | | |
| 2013/0324257 A1* | 12/2013 | Mizuki | .............. | G06F 17/30283 463/42 |
| 2013/0325957 A1* | 12/2013 | Mizuki | ................. | H04L 67/104 709/204 |
| 2014/0187314 A1* | 7/2014 | Perry | ...................... | A63F 13/10 463/29 |

FOREIGN PATENT DOCUMENTS

JP        2010-046159        3/2010

OTHER PUBLICATIONS

Mizuki et al., Office Action dated Nov. 17, 2015, issued in copending U.S. Appl. No. 14/189,324, filed Feb. 25, 2014 (8 pages).
Office Action dated Mar. 28, 2016 issued in related U.S. Appl. No. 14/189,324 (11 pgs.).

* cited by examiner

*Primary Examiner* — Mohamed Wasel
(74) *Attorney, Agent, or Firm* — Nixon & Vanderhye PC

(57) ABSTRACT

An information-processing system includes: at least one processor configured to display posting information relevant to an application on a display, which information is shared by plural users. The application is started and executed in response to selection of an object in a vicinity of a first item of posting information, while items of posting information are displayed on the display, using conditional additional information of the first item of posting information corresponding to the selected object.

16 Claims, 7 Drawing Sheets

| POSTING ID | USER ID | POSTING DATE AND TIME | MESSAGE BODY | REACTION INFORMATION | ADDITIONAL INFORMATION |
FIG. 7
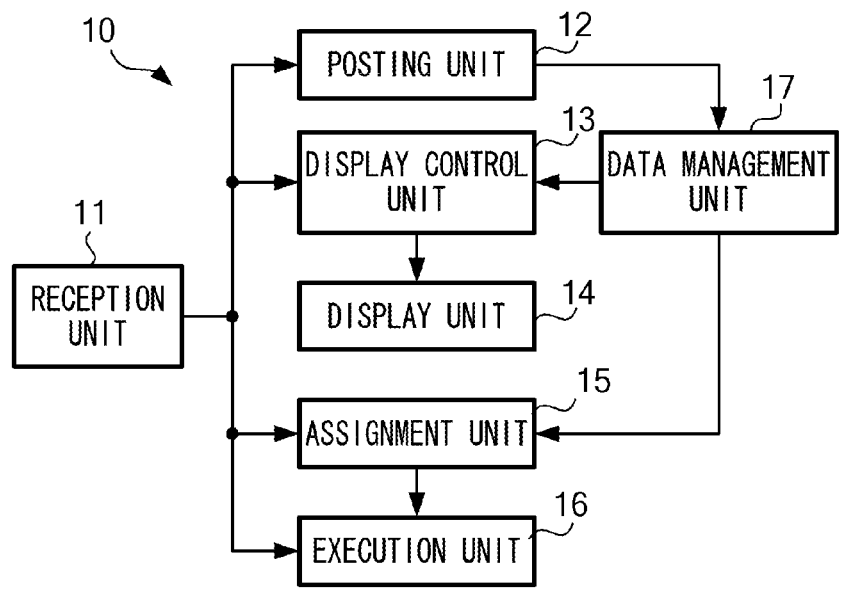
FIG. 8
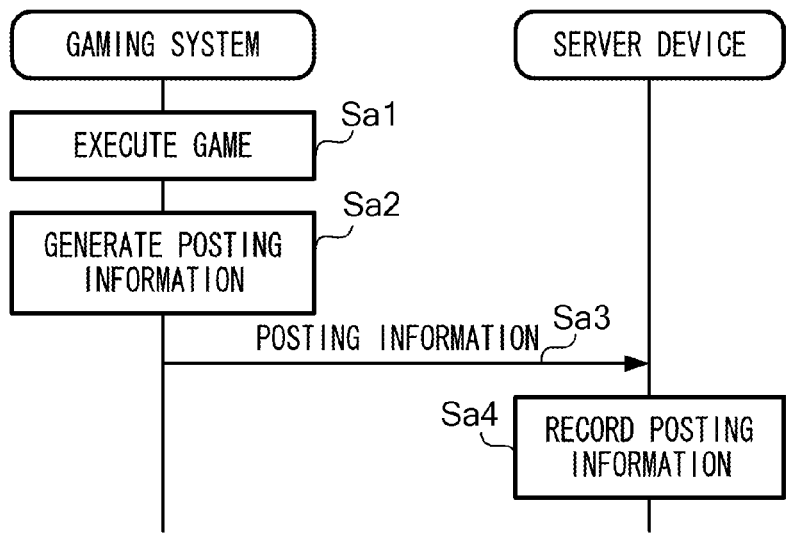
FIG. 9

INFORMATION-PROCESSING SYSTEM, INFORMATION-PROCESSING DEVICE, STORAGE MEDIUM, AND INFORMATION-PROCESSING METHOD FOR SHARING POSTING INFORMATION

CROSS-REFERENCE TO RELATED APPLICATIONS

This application is based on and claims priority under 35 U.S.C. 119 from Japanese Patent Application No. 2013-131912, which was filed on Jun. 24, 2013.

FIELD

The technology herein relates to sharing posting information related to an application such as a game.

BACKGROUND AND SUMMARY

Known in the art is a game system where posting information relating to a game can be shared. In the game system, not only text data but also image data may be posted. Such image data may be data displayed on a screen, or a screen shot of a game being played.

The present disclosure provides an information-processing system including: at least one processor; and an input device configured to acquire one or more items of posting information posted in connection with an application, the at least one processor configured to: display controller configured to display on the display the one or more items of posting information acquired by the input device; and execute, in response to a predetermined input operation performed by a user while the one or more items of posting information are displayed on the display, the application based on additional information indicative of an execution condition of the application.

BRIEF DESCRIPTION OF THE DRAWINGS

FIG. 7 shows a non-limiting example of a data structure of posting information.

FIG. 8 shows a non-limiting example of a functional configuration of an information sharing system.

FIG. 9 shows a non-limiting example of a sequence chart of a posting processing.

DETAILED DESCRIPTION OF NON-LIMITING EXAMPLE EMBODIMENTS

Figure 1:
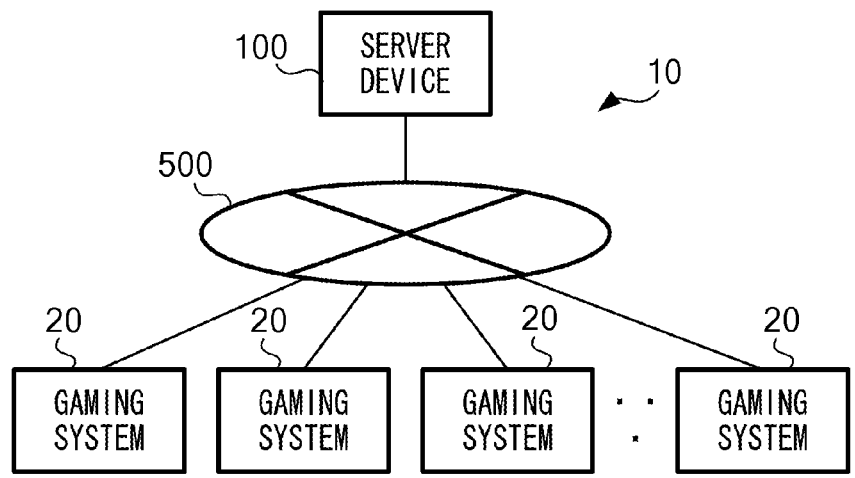
FIG. 1 shows a non-limiting example of a configuration of an information-sharing system.

FIG. 1 shows a non-limiting example of a configuration of information sharing system 10. Information sharing system 10 is a system for execution of a variety of games and for sharing of information posted (hereinafter, "posting information") in relation to the games. Information sharing system 10 has a function of executing a game and a function of sharing posting information. As used herein, the term "game" is used to refer to an example of application software (hereinafter, "application"), which application may include an action game, a shooting game, a role-playing game, and a puzzle game.

Information sharing system 10 includes server device 100 and plural gaming systems 20, which are interconnected via network 500. Network 500 is, for example, the Internet; however, network 500 may be any other network.

Server device 100 is a computer device that provides a service of sharing posting information (hereinafter, "information sharing service"). Server device 100 receives posting information from plural gaming systems 20, and enables users to share posting information in accordance with a predetermined rule(s). Server device 100 may receive posting information from a device other than gaming system 20.

Figure 2:
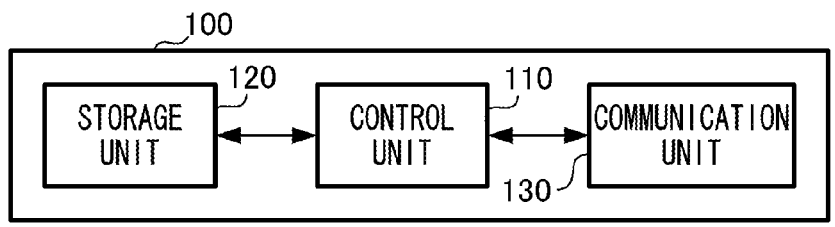
FIG. 2 shows a non-limiting example of a hardware configuration of a server device.

FIG. 2 shows a non-limiting example of a hardware configuration of server device 100. Server device 100 includes control unit 110, storage unit 120, and communication unit 130. Control unit 110 is a unit that controls operations of server device 100. Control unit 110 includes a processor such as a CPU (Central Processing Unit) and a main memory, by which operations of components of server device 100 are controlled upon execution of a program. Storage unit 120 is a unit that stores data, and may be referred to as "first storage unit." Storage unit 120 includes a storage medium such as a hard disk for storage of data such as posting information. Communication unit 130 is a unit that connects to network 500 for exchange of data with gaming system 20.

It is noted that data used by server device 100 may be stored in an external storage device, rather than in a storage device provided in server device 100, such as storage unit 120. It also is noted that functions of server device 100 may be provided upon cooperation of plural devices such as elements of a server group, rather than by a single device alone.

Gaming system 20 is an information-processing system, which may be installed in a user's home, and may be used by a single user or shared by plural users such as family members. In a case where gaming system 20 is shared by plural users, each user is identified by way of predetermined authentication processing such as password authentication.

Figure 3:
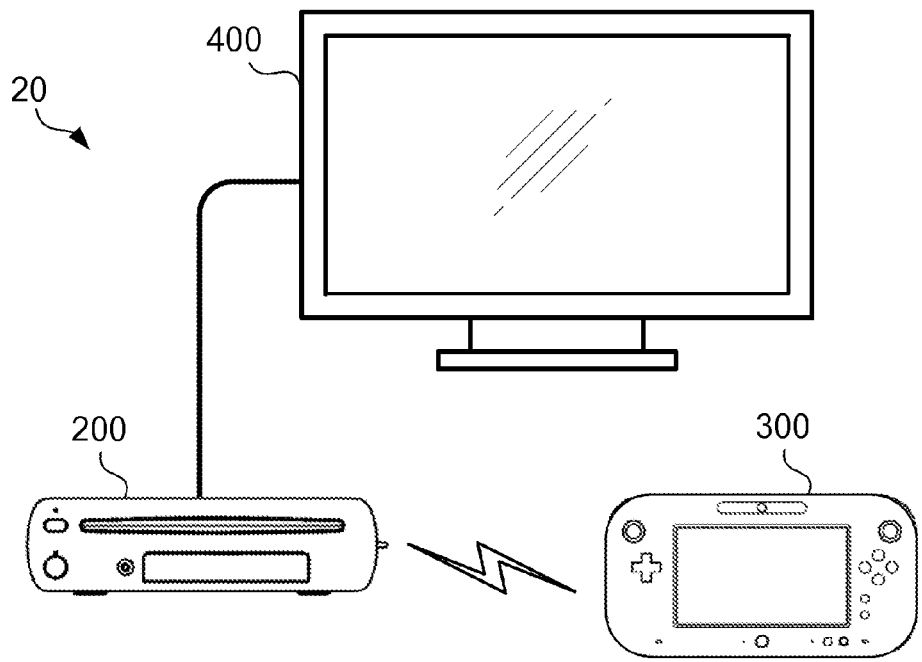
FIG. 3 shows non-limiting example of a configuration of equipment of a gaming system.

FIG. 3 shows a non-limiting example of a configuration of equipment of gaming system 20. Gaming system 20 includes main device 200, controller 300, and TV 400. In the present exemplary embodiment, gaming system 20 includes single controller 300; however, gaming system 20 may include plural controllers 300. Furthermore, gaming system 20 may, in addition to controller 300, include another controller for inputting characters, for use in a game.

Main device 200 is an information-processing device that executes a game, and provides an interface for a user to use an information sharing service. Main device 200 is connected to network 500, and performs processing necessary for executing a game, and also processing necessary for using an information sharing service. Main device 200 also performs display control of controller 300 and TV 400.

Controller 300 is a portable input terminal that is held and operated by a user. Controller 300 includes a touch-screen display area, and thus also serves as a display device. In the present exemplary embodiment, controller 300 exchanges data wirelessly with main device 200; however, controller 300 may have a wired connection to main device 200.

TV 400 is a display device that displays a game screen and posting information. TV 400 is connected to main device 200, and displays an image under control of main device 200. Gaming system 20 may include, instead of TV 400, any other display device such as a projector.

Figure 4:
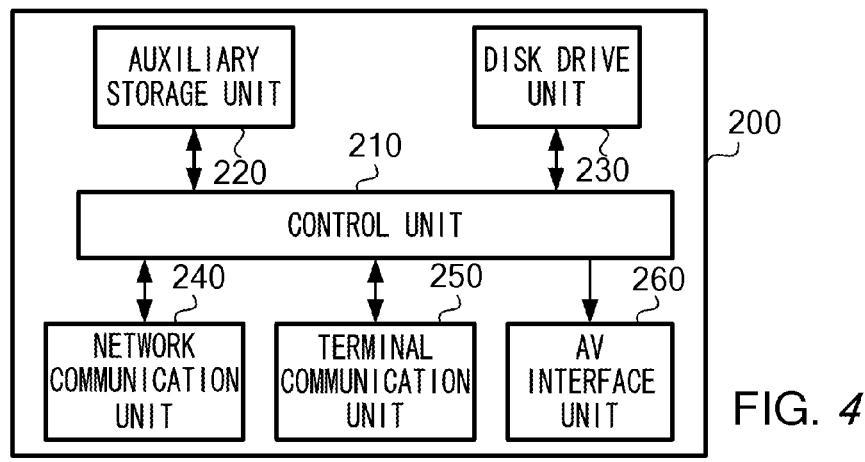
FIG. 4 shows a non-limiting example of a hardware configuration of a main device.

FIG. 4 shows a non-limiting example of a hardware configuration of main device 200. Main device 200 includes control unit 210, auxiliary storage unit 220, disk drive unit 230, network communication unit 240, terminal communication unit 250, and AV (Audio and Visual) interface unit 260.

Control unit 210 is a unit that controls operations of components of main device 200. Control unit 210 includes a processor such as a CPU or a GPU (Graphics Processing Unit), a memory such as a main memory or a VRAM (Video Random Access Memory), and an input/output interface for exchanging data with components of main device 200. Control unit 210 controls generation of image data to be sent to controller 300 or TV 400, by executing a program. Control unit 210 also controls communication with server device 100, and controls exchange and display of posting information. Exchange and display of posting information may be realized by use of a general-purpose application such as a Web browser or by use of a dedicated application.

Auxiliary storage unit 220 is a unit that stores data used by control unit 210. Auxiliary storage unit 220 is, for example, a flash memory or a hard disk. Alternatively, auxiliary storage unit 220 may be a combination of a detachable recording medium such as a memory card and a reader/writer. Auxiliary storage unit 220 may store programs to be executed by control unit 210 or data acquired via network communication unit 240 or terminal communication unit 250. For example, auxiliary storage unit 220 may store data on a game, which is sold online and has been downloaded, so that the game can be executed when needed.

Disk drive unit 230 is a unit that reads data stored on an optical recording medium such as an optical disk. The optical disk may be used for storage of data necessary for executing a game program. Disk drive unit 230 may read data stored on any other recording medium such as a magneto-optical disk or a semiconductor memory.

In the present exemplary embodiment, a storage unit on which a game program is stored, and which may be referred to as a "second storage unit," is one of auxiliary storage unit 220 and an optical disk. Main device 200 may use one of auxiliary storage unit 220 and an optical disk to execute a game.

Network communication unit 240 is a unit that communicates with network 500. Network communication unit 240 exchanges data with server device 100 under control of control unit 210. Terminal communication unit 250 is a unit that communicates with controller 300. Terminal communication unit 250 may perform wireless communication by using a communication system such as Wi-Fi (Registered Trademark), Bluetooth (Registered Trademark), or infrared.

AV interface unit 260 is a unit that provides image data and audio data to TV 400. AV interface unit 260 includes one or more interfaces such as an HDMI (High-Definition Multimedia Interface) (Registered Trademark) terminal or a component terminal.

Figure 5:
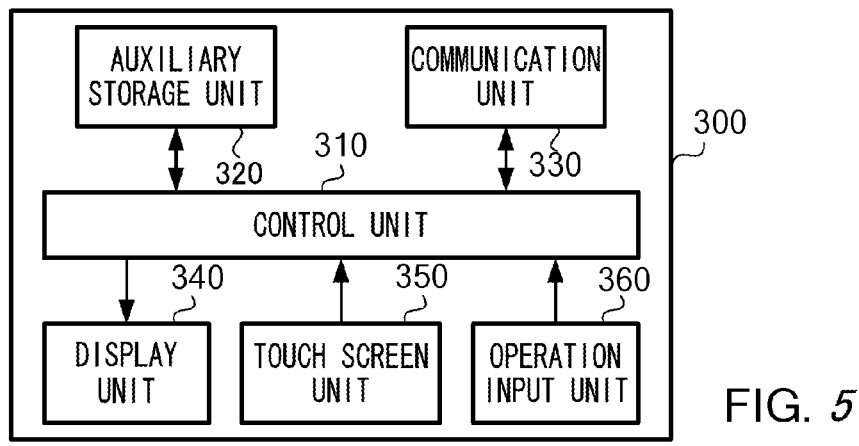
FIG. 5 shows a non-limiting example of a hardware configuration of a controller.

FIG. 5 shows a non-limiting example of a hardware configuration of controller 300. Controller 300 includes control unit 310, auxiliary storage unit 320, communication unit 330, display unit 340, touch screen unit 350, and operation input unit 360.

Control unit 310 is a unit that controls operations of components of controller 300. Control unit 310 includes a processor such as a CPU, a main memory, and an input/output interface for exchanging data with components of controller 300. Control unit 310 controls display of an image or exchange of data with main device 200, by executing a program.

Auxiliary storage unit 320 is a unit that stores data used by control unit 310. Auxiliary storage unit 320 is, for example, a flash memory. Alternatively, auxiliary storage unit 320 may be a combination of a detachable recording medium such as a memory card and a reader/writer.

Communication unit 330 is a unit that communicates with main device 200. Communication unit 330 includes an antenna for performing wireless communication with main device 200.

Display unit 340 is a unit that displays an image. Display unit 340 includes a display panel composed of pixels of a liquid crystal element or an organic EL (electroluminescence) element, and a drive circuit for driving the display panel. Display unit 340 displays an image within a predetermined display area of the display panel based on image data provided by control unit 310.

Touch screen unit 350 is a unit that detects an input operation performed by a user. Touch screen unit 350 generates and outputs coordinate information indicative of a position in a display area of display unit 340. Touch screen unit 350 includes a sensor provided on top of the display area, and a control circuit that generates coordinate information indicative of a position detected by the sensor, and provides the coordinate information to control unit 310. A method in which touch screen unit 350 detects a position may be a resistance film method, an electrostatic capacitance method, or any other method. A user may perform an input operation by use of his/her finger or by use of a pen-type instrument such as a stylus.

Operation input unit 360 is another unit that detects an input operation performed by a user. Operation input unit 360 includes selectable keys and switches, and provides control unit 310 with input operation information (for example, information indicative of whether a key is selected) corresponding to a user's input operation. Operation input unit 360 may include any number of keys and switches. Operation input unit 360 may include a keyboard or a pointing device such as a mouse.

The foregoing is a description of a hardware configuration of information sharing system 10. By using the thus-configured information sharing system 10, a user may play a game or exchange information within a community that is related to the game. A function for playing a game is provided mainly by each gaming system 20. An information sharing service is provided by cooperation of plural gaming systems 20 and server device 100.

An information sharing service according to the present exemplary embodiment is a service of sharing, among plural users, post information in relation to a game. In the information sharing service, posting information may be shared for each of plural games; and the posting information is managed by use of a bulletin board, more specifically, an electronic bulletin board.

In the present exemplary embodiment, posting of information is managed by a unit referred to herein as a "community."

The term "community" as used herein refers to a group associated with a game. Each community has one bulletin board. Plural communities may exist for one game. A user may belong to one or more communities, and may post information on a bulletin board of a community to which s/he belongs. Browsing of information posted on a bulletin board of a community may be restricted to users belonging to the community; alternatively, users not belonging to the community may be allowed to browse the information.

Figure 6:
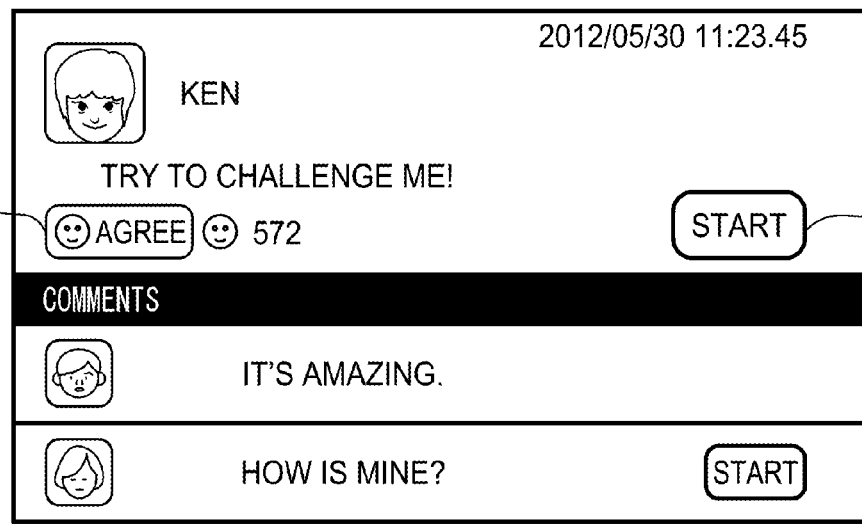
FIG. 6 shows a non-limiting example of a display of posting information.

FIG. 6 shows a non-limiting display example of posting information. Posting information may include, in addition to a message body, a character string (in the present example embodiment, "Ken") and an icon for identifying a contributor, and a posting date and time. In the present display example, agree button Bt1 and start button Bt2 are displayed in a display area for posting information. Agree button Bt1 consists of an image that is selectable by a user, who has browsed and is in agreement with posting information. A total number of users who agree with to posting information (hereinafter, "agree count") may be displayed near agree button Bt1. Start button Bt2 consists of an image that is selectable by a user, who intends to start a game associated with posting information. If a user selects start button Bt2, a game associated with posting information being browsed by the user, and associated with a community to which the user belongs, is executed. Start button Bt2 is an example of an image for accepting an instruction for execution of a game. In the present exemplary embodiment, start button Bt2 is displayed when posting information includes conditional additional information, which will be described later.

A user may make a comment on information posted by a contributor. Such a comment is one example of an item of posting information that may be associated with another item of posting information. A user may make a comment on a comment made by a contributor. Thus, posting information may have a hierarchical structure.

In the following description, an agreement and a comment made by a user will be referred to collectively as a "reaction." As used herein the term "reaction" refers to an attitude of a user expressed toward posting information. Such a reaction is not limited to an agreement or a comment, and may indicate either a positive or negative impression formed by the user; or may consist of an evaluation of posting information expressed by use of a score or a star rating.

FIG. 7 shows a non-limiting example of a data structure of posting information. Server device 100 stores, for each community (or for a bulletin board), posting information having the shown data structure. Posting information may include a posting ID, a user ID, a posting date and time, a message body, reaction information, and additional information. The posting ID consists of information for identifying posting information. The user ID is information pre-assigned to a user for identifying the user. In the present exemplary embodiment, the user ID is used to identify a contributor of posting information. The posting date and time consists of information that indicates each of date and time when the posting information was posted. The message body consists of information in the form of characters and symbols input by a user. The reaction information is information indicative of a reaction(s) to the posting information, which may include a number of agreements, user ID(s) of user(s) who are in agreement with the posting information, posting ID(s) of comment(s), or a user ID(s) of a user(s) who has made a comment. The additional information is added together with the message body when the posting information is posted. The additional information is added as binary data. It is noted that the posting information need not include reaction information and/or additional information.

A user may add various types of data as additional information. For example, a user may add data generated by playing a game (or a UGC (User Generated Content)) as additional information. Specifically, such additional information consists of data of a screen shot of a play scene of a game, or of data generated when a predetermined condition such as winning a game or achieving a high score in a game is achieved. Alternatively, the additional information may be image data consisting of handwritten characters or an illustration drawn by a user on a touch screen.

In the present exemplary embodiment, the additional information may include data based on which a user is able to execute a game under a predetermined condition. The condition will hereinafter be referred to as "execution condition (of a game)." Specifically, hereinafter, additional information that indicates an execution condition of a game will be referred to as "conditional additional information."

Conditional additional information is, for example, data indicative of a content used by a user in a game. The content may be add-on data such as a game item that can be used in a game (for example, a weapon that improves an ability of a user's character), or an additional game scenario. In a case where conditional additional information indicative of such a content is used, a user is able to play a game under a condition different from that when the conditional additional information is not used. For example, a user may play a game using a special game item according to conditional additional information.

The conditional additional information may be ghost data. The term "ghost data" as used herein refers to data based on which a game play of a user can be reproduced. For example, ghost data used in a racing game is data based on which a performance of a machine operated by a user at a certain stage (specifically, on a racing course), which has achieved a good score, can be reproduced. Based on the ghost data, a translucent image of the machine may be displayed on the screen. A user may have a race with the machine that moves based on the ghost data; or may emulate a performance of the machine to achieve a higher score. In another example, ghost data used in a fighting game is data indicative of a character reflecting characteristics (for example, an attack pattern) of a user. A user is able to enjoy a pseudo battle with another user by fighting a character indicated by ghost data.

The conditional additional information may be data based on which a game can be started from a certain stage. For example, the conditional additional information is data based on which an action game having plural stages can be played from a certain stage, which stage normally is reached after several other stages have been completed. By utilization of conditional additional information, a user is able to skip several stages to play a game from a certain stage.

Specific content of conditional additional information may depend on a game. Data referred to as conditional additional information, and a format of conditional additional information may be determined by a provider (for example, a manufacturer or a developer) of a game. Accordingly, an execution condition specified by conditional additional information may depend on a game design.

A user may post or browse posting information using gaming system 20. For example, a user, upon reaching a stalemate in a game, may request advice by posting an inquiry. In another example, a user, when having satisfied a predetermined condition such as achieving a high score, may post additional information.

A user may also browse posting information, and proceed with a game with reference to the posting information. A user also may check a reputation of a game before purchasing the game. Further, a user may browse posting information to which additional information is added, and select start button Bt2 as described above to start a game associated with the posting information so that the game is executed under a predetermined condition.

FIG. 8 shows a non-limiting example of a functional configuration of information sharing system 10, by which information sharing is realized. Information sharing system 10 realizes sharing of information and execution of a game by use of reception unit 11, posting unit 12, display control unit 13, display unit 14, assignment unit 15, execution unit 16, and data management unit 17. Reception unit 11, posting unit 12, display control unit 13, display unit 14, and execution unit 16 are functions realized by gaming system 20. Assignment unit 15 and data management unit 17 are functions realized by server device 100.

Reception unit 11 is a unit that accepts a user's input operation. Reception unit 11 acquires input operation information provided by operation input unit 360 and coordinate information provided by touch screen unit 350 and thereby is able to recognize a user's input operation. Reception unit 11 outputs an instruction to perform a processing according to the recognized input operation.

Posting unit 12 is a unit that posts posting information. Posting unit 12 generates posting information according to a user's input operation, and sends the generated posting information to server device 100. Posting unit 12 may, when required, generate posting information to which additional information is added. Additional information may or may not be added to posting information. The posting information sent by posting unit 12 is managed by data management unit 17 in server device 100.

Display control unit 13 is a unit that controls display of display unit 14. Display control unit 13 causes display unit 14 to display posting information of a community according to a user's input operation. Display control unit 13 acquires posting information managed by data management unit 17 via network 500. Display control unit 13 controls display of game screens during execution of a game.

Display unit 14 is a unit that displays information. Display unit 14 corresponds to TV 400 and controller 300 (in particular, touch screen unit 350). Display unit 14 may display a game screen on one of TV 400 and controller 300, and display posting information on the other. Alternatively, display unit 14 may display the same information on both TV 400 and controller 300.

Assignment unit 15 is a unit that assigns conditional additional information to a user. The assignment performed by assignment unit 15 enables a user to use conditional additional information. Assignment unit 15, when a predetermined input operation is performed by a user who browses posting information, assigns conditional additional information to the user, which corresponds to the input operation. The predetermined input operation herein refers to an input operation to select start button Bt2 as described above. The input operation may include an input operation to tap (or press) start button Bt2 on a touch screen, or an input operation to place a cursor over start button Bt2 and press a predetermined button.

Execution unit 16 is a unit that executes a game. Execution unit 16, for example, executes a game read by disk drive unit 230, according to a user's input operation. Execution unit 16 has a function of receiving conditional additional information assigned by execution unit 16, and of executing a game based on the conditional additional information. Execution unit 16, when conditional additional information is assigned to a user, receives the conditional additional information to execute a game under an execution condition indicated by the conditional additional information. Execution unit 16 executes a game differently depending on whether conditional additional information has been assigned or not.

Execution unit 16 is a unit that manages data such as posting information. Data management unit 17 collects and manages pieces of posting information posted by users. Such management may consist of a notification of posting information sent to gaming system 20 so that posting information may be browsed using gaming system 20. Data management unit 17 is an example of a notification unit that sends a notification of posting information. Data management unit 17 may store posting information posted by a unit of a community, and associate the posting information with user information. Such user information is information relevant to a user, and may include a user ID or a user's icon, which is described above. Such user information also may include a community ID of a community to which a user belongs, information (for example, a password) necessary for authentication processing, or information (for example, credit-card information) necessary for purchasing content online, such as a game.

FIG. 9 shows a non-limiting example of a sequence chart of a posting processing. The posting processing is carried out when a user satisfies a predetermined condition while playing a game, and posts posting information to which conditional additional information is added. The predetermined condition may include setting a new time record or score, or completion of a task assigned in a game, or achievement of a particular goal.

In the posting processing, gaming system 20 (specifically, main device 200) executes a game according to a user's input operation (step Sa1). In step Sa1, it is assumed that a user has satisfied a predetermined condition while playing the game.

When a predetermined condition is satisfied, gaming system 20 generates posting information (step Sa2). When doing so, gaming system 20 may interrupt the game to display a dialog box with a message "Post information on bulletin board?," which queries a user as to whether information is to be posted, and prompts the user to input posting information. Alternatively, gaming system 20, when the above predetermined condition is satisfied, may automatically (namely, without an explicit input operation being performed by the user) generate posting information. In such a case, a message body of the posting information may consist of a prepared fixed phrase. When gaming system 20 generates posting information, gaming system 20 may generate conditional additional information according to a condition satisfied by the user or a progress status of the game, and include the conditional additional information in the posting information. A determination as to whether additional information should be added to the posting information may be made according to a user's input operation, which operation may be similar to an input operation for attaching a file to an email. Alternatively, the determination may be automatically made by main device 200. In a case where plural pieces of additional information exist, which plural additional information can be attached to the posting information, gaming system 20 may allow the user to select one of the plural pieces of additional information, and add the selected additional information to posting information. Conditional additional information may include an ID for identifying the game.

After generating the posting information, gaming system 20 sends the posting information to server device 100 via network 500 (step Sa3). Upon doing so, gaming system 20 sends the posting information together with information identifying a destination community. When server device 100 receives the posting information, server device 100 records the posting information in association with the destination community (or a bulletin board of the community) (step Sa4).

The user may post posting information in a method other than the method shown in FIG. 9. For example, the user may post posting information or provide a reaction such as an agreement or a comment by performing an input operation while a bulletin board is displayed.

Figure 10:
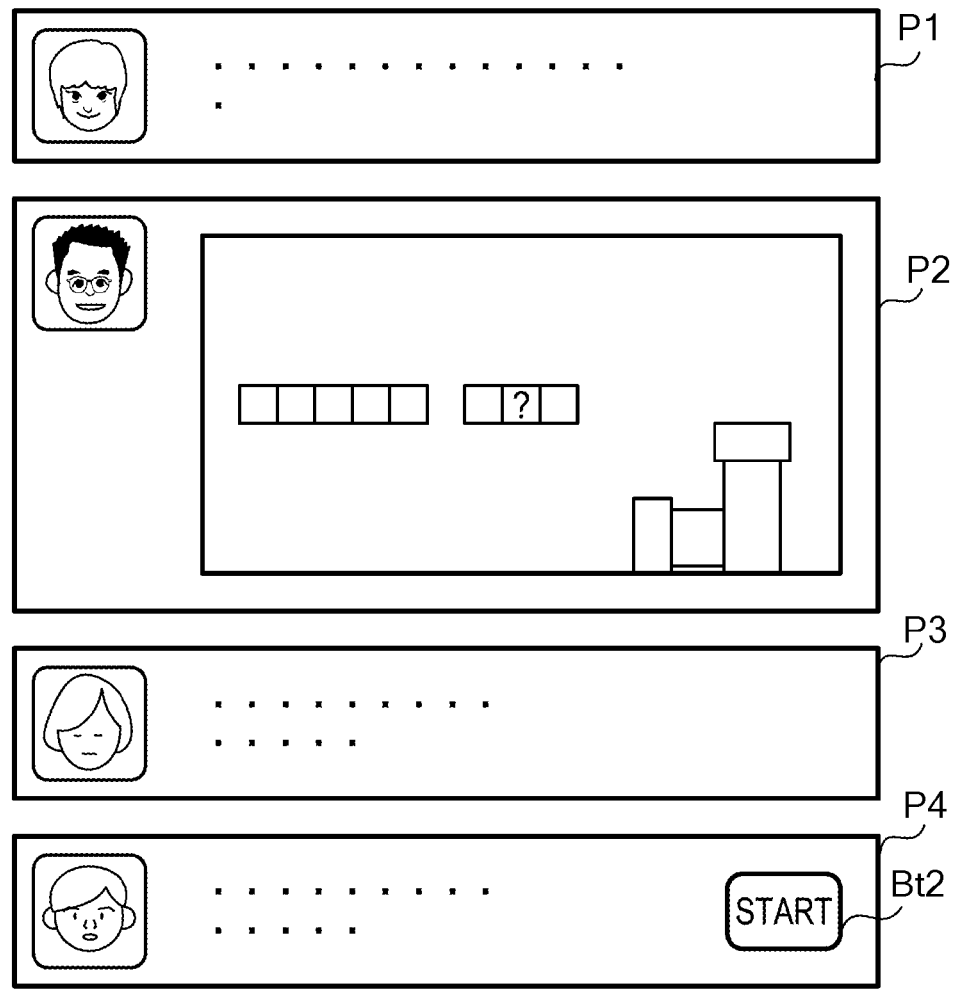
FIG. 10 shows a non-limiting example of a display of a bulletin board.

FIG. 10 shows a non-limiting example of a display of a bulletin board. Gaming system 20 receives items of posting information, and displays them on a community-based bulletin board. Gaming system 20 displays the items of posting information in a predetermined order. The display order may be, for example, determined based on a posting date and time, the number of agreements, or the number of comments.

In FIG. 10, reference signs P1 to P4 represent posting information. Items of posting information P1 and P3 are posting information to which additional information is not added. Items of posting information P2 and P4 are an example of posting information to which additional information is added. Items of posting information P2 and P4 are displayed in a manner different from that of posting information P1 or P3. Posting information P2 is posting information to which data on a screen shot of a game is added as additional information. Posting information P4 is posting information to which conditional additional information is added. Posting information P4 is different from other items of posting information P1 to P3 in that start button Bt2 is displayed. Posting information P4 is an example of posting information that is displayed in a first manner. Items of posting information P1 to P3 are an example of posting information that is displayed in a second manner.

Figure 11:
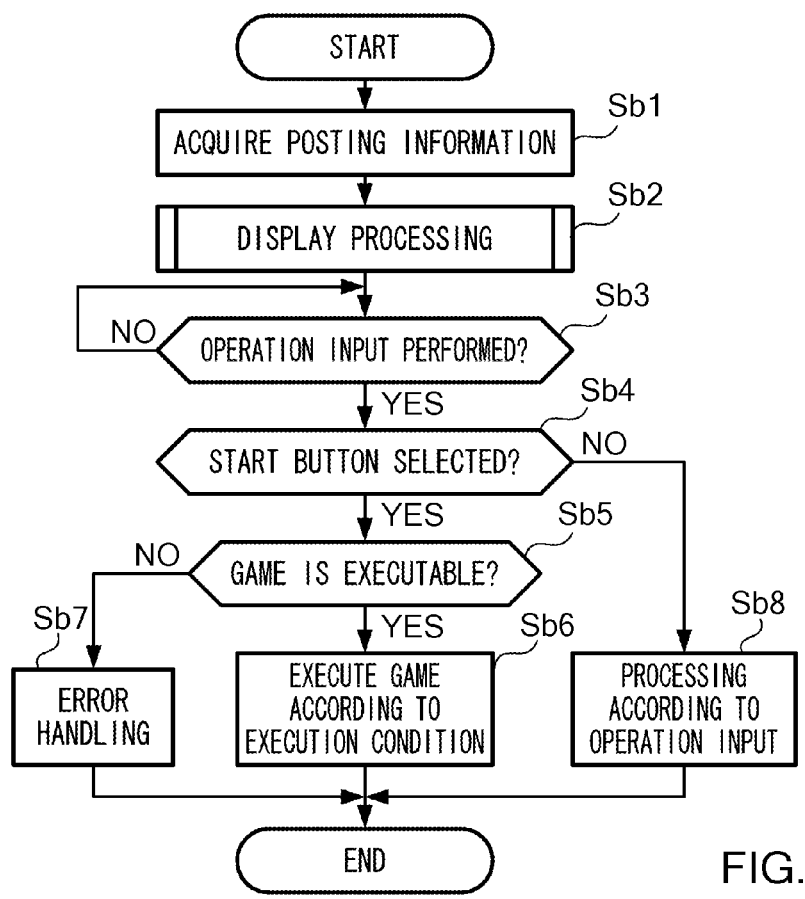
FIG. 11 shows a non-limiting example of a flowchart of processing performed by a main device.

FIG. 11 shows a non-limiting example of a flowchart of a processing series from displaying posting information to executing a game. The processing is performed by main device 200 of gaming system 20.

Control unit 210 of main device 200 initially acquires items of posting information to display them (step Sb1). Control unit 210 acquires the items of posting information, which correspond to a certain community, from server device 100 via network 500. Subsequently, control unit 210 executes a display processing described below for each of acquired items of posting information (step Sb2).

Figure 12:
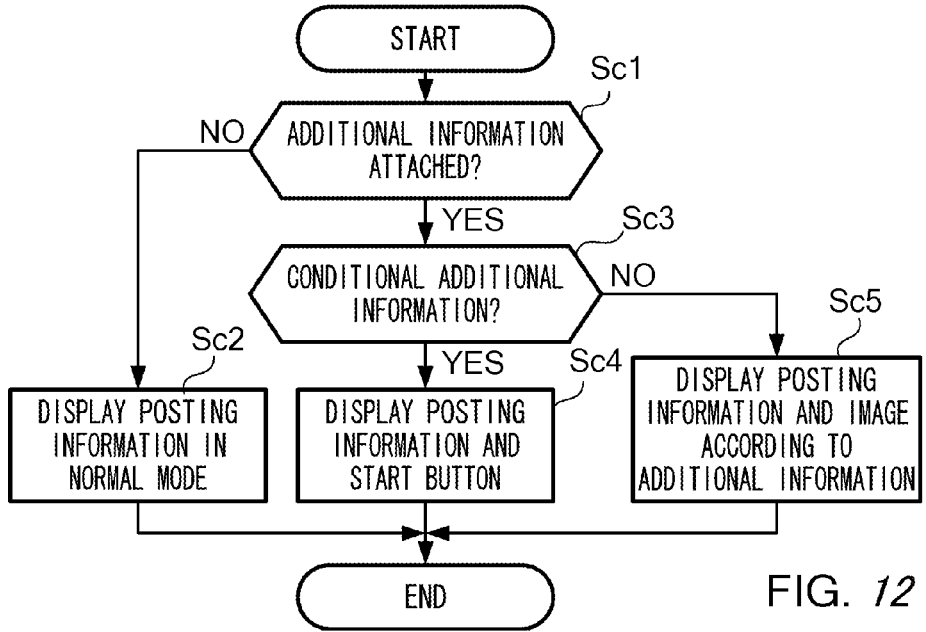
FIG. 12 shows a non-limiting example of a flowchart of processing (display processing) performed by a main device.

FIG. 12 shows a non-limiting example of a flowchart of display processing. Control unit 210 performs the processing shown in FIG. 9 for each of the items of posting information to be displayed. Control unit 210 repeatedly performs the processing until all of the items of posting information have been subjected to the processing.

Control unit 210 determines a display manner of posting information based on additional information (specifically, a presence or absence of additional information, and if present a content of additional information). More specifically, control unit 210 determines whether additional information is added to the posting information (step Sc1). If additional information is not added to the posting information, control unit 210 displays the posting information in a predetermined manner (step Sc2). Hereinafter, this display manner will be referred to as a "normal manner," which manner is an example of the second manner according to the present technology.

On the other hand, if additional information is added to the posting information, control unit 210 further determines whether the additional information is conditional additional information (step Sc3). If the additional information is not conditional additional information, control unit 210 displays the posting information together with an image such as a screen shot according to the additional information (step Sc5). If the additional information is conditional additional information, control unit 210 displays the posting information together with a start button (step Sc4). The display manner is an example of the first manner of the present technology.

Control unit 210 may sequentially perform the display processing shown in FIG. 12, and display an item of posting information each time the display processing is completed. Alternatively, control unit 210 may perform in parallel the display processing, and display plural items of posting information simultaneously after parallel processing is completed. Control unit 210 may simultaneously display all items of posting information that have been posted on a bulletin board of a certain community. Alternatively, control unit 210 may simultaneously display items of posting information, a number of which corresponds to a size of a screen, and may switch items of posting information to other items in response to an input operation such as scrolling.

After the display processing is completed for all of the items of posting information, a list of plural items of posting information is displayed. While the list is displayed, control unit 210 determines whether an input operation has been performed by the user (step Sb3). If an input operation has not been performed by the user, control unit 210 continues to display the list of the items of posting information.

If an input operation has been performed by the user, control unit 210 performs a processing according to the input operation. The present example embodiment is characterized by a processing performed when a start button is selected; accordingly, such processing will be described in detail. In contrast, processing performed when other input operations are being performed will be described concisely.

Control unit 210 determines whether the user's input operation is an input operation to select a start button (step Sb4). If the user's input operation is not an input operation to select a start button, control unit 210 performs according to the input operation (step Sb8). For example, control unit 210 may accept an input of posting information or a comment to send it, or may scroll through the list of the items of posting information.

If the user's input operation is an input operation to select a start button, control unit 210 identifies a game associated with posting information, in connection with which the start button is displayed, and determines whether the game can be executed in main device 200 (step Sb5). For example, control unit 210 may determine whether the user of main device 200 possesses the game. Alternatively, control unit 210 may determine whether an optical disk inserted in disk drive unit 230 is an optical disk on which data of the game is stored. Alternatively, control unit 210, in a case where game data is stored in auxiliary storage unit 220, may search auxiliary storage unit 220.

If the game corresponding to the selected start button (specifically, the game corresponding to conditional additional information associated with the start button) can be executed, control unit 210 starts the game so that the game is executed under an execution condition indicated by the conditional additional information (step Sb6). When doing so, control unit 210 passes the conditional additional application from an application that displays and exchanges posting information to an application that executes the game. It is to be noted that in a case where an optical disk storing data of the game has not been inserted in disk drive unit 230 although the game is possessed by the user, control unit 210 may display a message "Please insert disk," and execute the game after the optical disk has been inserted.

If the game corresponding to the selected start button cannot be executed, control unit 210 executes a predetermined error handling, instead of executing the game (step Sb7). The error handling may consist of displaying a message "The game cannot be played." Alternatively, when the game is sold online, control unit 210 may display a URL (Uniform Resource Locator) of a Web site where the game can be purchased, thereby prompting the user to purchase the game. If the user has purchased the game and the game thus can be executed, control unit 210 may execute the game such that the game is executed under an execution condition indicated by the conditional additional information.

As described in the foregoing, information sharing system 10 enables smooth execution of a game in a situation where information posted on a bulletin board is browsed. A user of information sharing system 10 may start a game, if the game is available, by selecting a start button, without any need to perform complicated input operations to start the game. Namely, information-sharing system 10 ensures a linkage between browsing of posting information and execution of a game.

In information sharing system 10, gaming system 20 of a user who browses posting information may be caused, based on conditional additional information, to execute a game under an execution condition. Accordingly, the user of gaming system 20 may have a game experience similar to that of another user (or a contributor), or may have a game experience as if s/he plays a game together with another user, whereby his/her communication with other users may be promoted on a bulletin board. By use of conditional additional information, the user also may skip an early stage of the game and start the game from a stage that is new to the user.

Modifications

The present technology may be modified as described below, and each of the following modifications may be combined with each other.

(Modification 1)

A start button may be displayed for each item of posting information regardless of whether conditional additional information is added to posting information. In the case, main device 200 differentiates a method of executing a game between a case where a start button has been selected for posting information to which conditional additional information is added, and a case where a start button has been selected for posting information to which conditional additional information is not added. In the former case, main device 200 executes a game under an execution condition indicated by the conditional additional information. In the latter case, since an execution condition does not exist, main device 200 executes a game in a normal mode as in the case where the game is started without using a start button. Main device 200 may cause an appearance of a start button to change, for example a color, shape or characters displayed in the start button so that a user is able to differentiate start buttons as having different functions as described above.

Main device 200 may execute a game in response to an input operation to tap a display area of posting information, instead of a selection of a start button. In the case, since the entire display area of posting information serves as a start button, it is not necessary to display a dedicated image to execute a game, such as start button Bt2.

(Modification 2)

Figure 13:
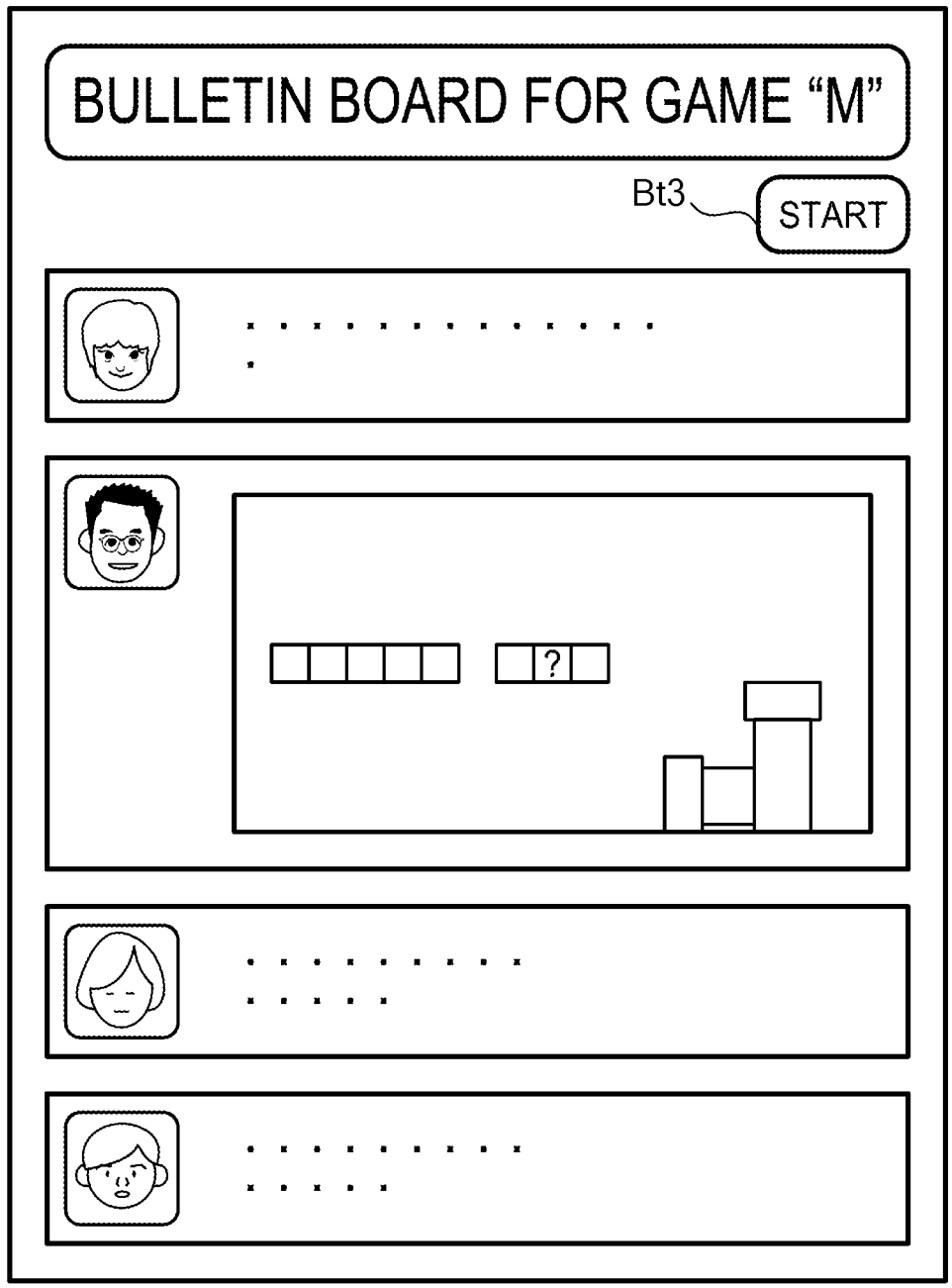
FIG. 13 shows a non-limiting example of a display of a start button.

A start button need not necessarily be associated with posting information. FIG. 13 shows another non-limiting example of a display of a start button. In the example shown in FIG. 13, start button Bt3 is associated with a bulletin board, rather than with posting information, and the button is displayed at a predetermined position on the bulletin board upon setting of conditional additional information by a manager of the bulletin board.

For example, if the bulletin board is a bulletin board of a community for a racing game, a manager of the bulletin board may receive a report of a fast time from users belonging to the community, and distribute ghost data for reproducing a fastest run in response to selection of start button Bt3. Such a distribution of data may be realized by software processing carried out in server device 100, rather than by manual handling carried out by the manger.

(Modification 3)

A contributor need not necessarily be a user of a game. For example, a contributor may be a manager of a bulletin board. If a contributor is a manager of a bulletin board, and the manger is a provider of a game, the contributor may distribute by way of the bulletin board special add-on data such as an additional game scenario. A bulletin board according to the present technology may be such that it can be browsed by a person and accept posting of information by a person regardless of whether s/he is a user of a game.

(Modification 4)

In the above example embodiment, a determination as to whether a game can be executed in gaming system 20 is made in main device 200 after a start button is selected (step Sb5). However, the determination may be made at server device 100 in advance, rather than in gaming system 20. For example, if information on games possessed by a user is stored in server device 100 as user information, server device 100 may determine whether a game can be executed in gaming system 20 of the user.

In a case where the determination is made at server device 100, server device 100 may prevent display of a start button used for starting a non-executable game. Whether a start button is displayed may depend on whether a game started using the start button is possessed by a user. Alternatively, server device 100 may cause an appearance of a start button to change depending on whether a start button is used for starting an executable game or a start button is used for starting a non-executable game. For example, server device 100 may cause a start button used for starting a non-executable game to be displayed in a grayed-out form so that a user is provided with visual information that the start button cannot be selected. Such a display control of a start button may be performed in main device 200, instead of at server device 100.

(Modification 5)

In the above example embodiment, additional information is a part of posting information, and is sent to main device 200 as a part of posting information; however, additional information need not necessarily comprise a part of posting information; and additional information may be downloaded to main device 200 independently from posting information. For example, main device 200 may display posting information together with a start button, and download additional information in response to a user's selection of the start button, whereby necessary additional information is able to be downloaded.

(Modification 6)

According to the present technology, limitation of a number of uses of conditional additional information or of a period of time of use of conditional additional information may be imposed. For example, conditional additional information may be downloaded only to first users of the predetermined number. Alternatively, conditional additional information may be used only for a week after the information has been downloaded. Such a limitation may be set by a user (specifically, a contributor).

(Modification 7)

The technology may be applied to an application other than a game. For example, the technology may be applied to an entertainment application other than a game, or an educational or learning support application.

(Modification 8)

A hardware configuration according to the present technology is not limited to the hardware configuration according to the above exemplary embodiment. For example, the number of display units need not necessarily be plural; specifically, only one of TV 400 and display unit 340 may be used. If only one of TV 400 and display unit 340 is used, main device 200 may switch a screen between a game screen and a posting information display screen depending on a user's input.

Gaming system 20 has a function both of executing a game and of browsing posting information; however, these functions may be shared between different devices. For example, a function of executing a game may be realized in a game machine, while a function of browsing posting information may be realized at a display terminal such as a personal computer or a smartphone. In the case, an input operation to select a start button may be performed to the display terminal, and conditional additional information may be downloaded to the game machine in the same manner as in the case of modification 5. The game machine need not start a game immediately after conditional additional information has been downloaded; rather the game may be started dependent on a user's instruction.

In the above example embodiment, the notification unit is a unit that sends posting information to gaming system 20; however, the notification unit may be a unit that notifies gaming system 20 of a URL (Uniform Resource Locator) used for displaying the posting information. Generally speaking, the notification unit may be a unit that notifies information necessary for a user to browse posting information.

(Modification 9)

Rather than an information-processing system, the present technology may be applied to a server device, an information-processing device, which is a part of main device 200, or an information-processing method.

Figure 14:
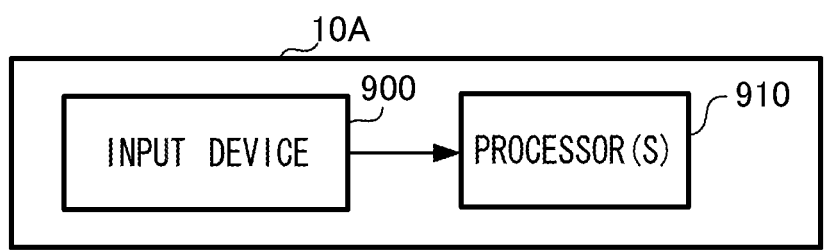
FIG. 14 shows a non-limiting example of an information-processing system.

In an embodiment of the present technology, an information-processing system 10A includes: an input device 900 configured to acquire one or more items of posting information posted in connection with an application; and at least one processor 910 configured to: display the one or more items of posting information acquired by the input device on a display; and execute, in response to a predetermined input operation performed by a first user while the one or more items of posting information are displayed on the display, the application based on additional information indicative of an execution condition of the application, as shown in FIG. 14.

The present technology also may be applied to a program such that the program causes a computer to provide functions of server device 100 or main device 200. The program may be downloaded to a server device via a recording medium such as an optical disk or a semiconductor memory, or via a network such as the Internet.

What is claimed is:

1. An information-processing system comprising:
    at least one processor;
    an input device configured to acquire items of posting information posted in connection with an application; and
    a memory;
    the at least one processor configured to:
        display the items of posting information acquired by the input device on a display; at least a first item of the displayed items of posting information including conditional additional information for starting execution of the application, and at least a second item of the displayed items of posting information not including conditional additional information for starting execution of the application; and at least an object to input a user's instruction of executing the application in a vicinity of at least the first item of the displayed items of posting information; and
        start and execute, in response to selection of the object by the user, while the items of posting information are displayed on the display, the application using the conditional additional information of the first item of the displayed items of posting information corresponding to the selected object.

2. The information-processing system according to claim 1, wherein additional information is data associated with one or more of the items of posting information.

3. The information-processing system according to claim 2, wherein:
    additional information differs for each of the items of posting information.

4. The information-processing system according to claim 2, wherein:
    one or more of the items of posting information are posted by a second user of the application; and
    the additional information is data generated when the application is executed by the second user.

5. The information-processing system according to claim 4, wherein the additional information is data generated when the application is executed by the second user, and a predetermined condition is satisfied.

6. The information-processing system according to claim 2, wherein a user posts posting information to which additional information is added via the input device.

7. The information-processing system according to claim 6, further comprising a generator configured to generate posting information to which additional information selected by the user is added.

8. The information-processing system according to claim 2, wherein:
    the items of posting information include first posting information associated with the additional information, and second posting information not associated with the additional information;
    the at least one processor displays on the display the first posting information in a first manner indicative that the application can be executed, and displays on the display the second posting information in a second manner different from the first manner; and
    the processor executes, in response to the predetermined input operation performed by the user, directed to the first posting information, the application according to the execution condition indicated by the additional information associated with the first posting information.

9. The information-processing system according to claim 8, wherein:
    the processor determines whether the additional information associated with the first posting information is a predetermined additional information; and
    the at least one processor displays on the display the first posting information in the first manner, the first posting information being posting information that has been determined by the determination unit to be associated with the predetermined additional information.

10. The information-processing system according to claim 8, wherein when the first posting information is displayed in the first manner, an image for accepting an instruction to execute the application is displayed, and when the second posting information is displayed in the second manner, the image is not displayed.

11. The information-processing system according to claim 1, wherein additional information is data indicative of a content used in the application.

12. An information-processing system comprising:
a server device; and
an information-processing device, wherein:
the server device comprises:
    a first memory in which posting information posted in connection with an application is stored; and
    a notification unit configured to notify the information-processing device of the posting information stored in the first storage unit, and
the information processing device comprises:
    one of (i) a second memory in which the application is stored and (ii) a reader configured to read the application stored in the second memory; and
    at least one processor configured to:
        display on the display, using the posting information notified by the notification unit, at least a first item of the displayed items of posting information including conditional additional information for starting execution of the application, and at least a second item of the displayed items of posting information not including conditional additional information for starting execution of the application, and at least an object to input a user's instruction of executing the application in a vicinity of at least the first item of the displayed items of posting information; and
        start and execute, in response to selection of the object by the user, while the items of posting information are displayed on the display, the application using the conditional additional information of the first item of the displayed items of posting information corresponding to the selected object.

13. The information-processing system according to claim 12, wherein the processor, when the application cannot be executed in the information-processing device, performs a processing other than a processing of executing the application.

14. An information-processing device comprising at least one processor configured to:
display posting information relevant to an application on a display, which information is shared by plural users, the posting information including at least a first item including conditional additional information for starting execution of the application and at least a second item not including conditional additional information for starting execution of the application;
display at least an object to input a user's instruction of executing the application in a vicinity of at least the first item of posting information; and
start and execute, in response to selection of the object by the user, while the items of posting information are displayed on the display, the application using the conditional additional information of the first item of posting information corresponding to the selected object.

15. A non-transitory storage medium that stores a program for causing a computer to execute:
displaying, on a display, posting information relevant to an application, which information is shared by plural users, the posting information including at least a first item including conditional additional information for starting execution of the application and at least a second item not including conditional additional information for starting execution of the application;
displaying at least an object to input a user's instruction of executing the application in a vicinity of at least the first item of posting information; and
starting and executing, in response to selection of the object by the user, while the items of posting information are displayed on the display, the application using the conditional additional information of the first item of posting information corresponding to the selected object.

16. An information-processing method comprising:
acquiring posting information posted in connection with an application;
displaying the acquired posting information on a display, the posting information including at least a first item including conditional additional information for starting execution of the application and at least a second item not including conditional additional information for starting execution of the application;
displaying at least an object to input a user's instruction of executing the application in a vicinity of at least the first item of posting information; and
starting and executing, in response to selection of the object by the user, while the items of posting information are displayed on the display, the application using the conditional additional information of the first item of posting information corresponding to the selected object.

* * * * *